Figures 1, 2, 3, 4, 5:
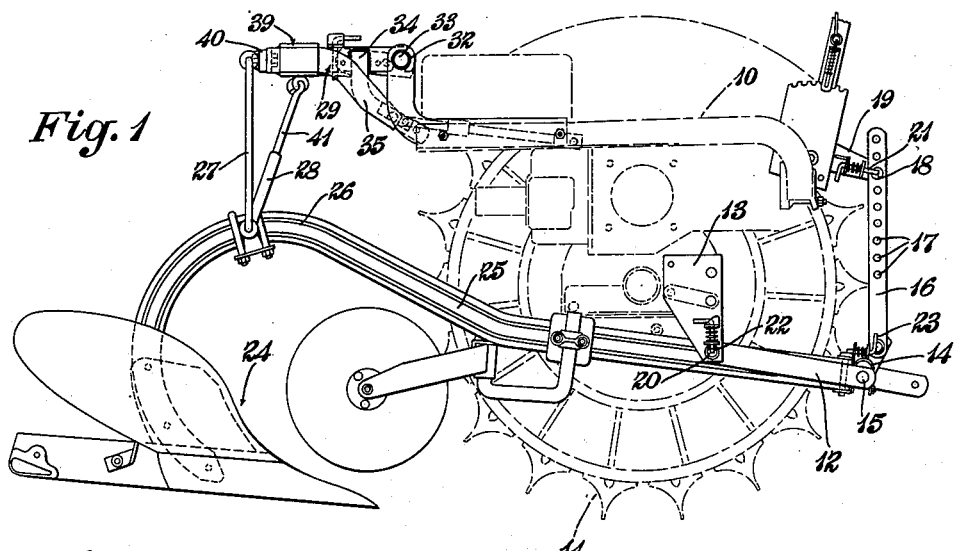

Dec. 2, 1952  J. L. BEAMER  2,619,885
HOOKUP FOR TRACTOR PLOWS
Filed May 23, 1949

INVENTOR.
John L. Beamer
BY
Frease and Bishop
ATTORNEYS

Patented Dec. 2, 1952

2,619,885

UNITED STATES PATENT OFFICE 2,619,885

HOOKUP FOR TRACTOR PLOWS

John L. Beamer, Homeworth, Ohio

Application May 23, 1949, Serial No. 94,783

2 Claims. (Cl. 97—47)

The invention relates to a means for detachably connecting a plow to a tractor, and more particularly to a hookup which may be quickly and easily operated to connect the plow to the tractor and detach it therefrom.

The object of the invention is to provide a detachable connection by means of which the plow may be instantly attached to or detached from the tractor.

Another object is to provide such a detachable connection which is controlled by a spring loaded pin.

A further object is to provide a hookup of this character which does not require the removal of bolts, nuts, screws, cotter pins or the like in order to disconnect the plow from the tractor.

A still further object is to provide such a hookup comprising means for detachably connecting the rear portion of the plow beam to the lift yoke of the tractor and for detachably connecting the forward end of the plow beam to the draw bar of the tractor, each connection being made by means of a spring loaded pin.

Another object is to provide similar connections for detachably connecting the draw bar of the tractor to the draw bar anchor plate and control link.

A further object is to provide such a structure in which the lift yoke of the tractor is formed of two separable parts, detachably held together by means of a spring loaded pin, whereby when it is desired to detach the plow from the tractor the spring loaded pin is operated to disconnect the detachable portion of the lift yoke with the plow.

A still further object is to provide a spring loaded pin which normally retains the draft pin in position to attach the forward end of the plow beam to the draw bar of the tractor.

Another object of the invention is to provide such a hookup which does not require any material change in the construction or design of the tractor or the plow.

The above and other objects, apparent from the drawing and following description, may be attained and the above described advantages and results obtained, by the apparatus, construction, arrangement, combinations and parts which comprise the present invention, a preferred embodiment of which, illustrative of the best mode in which applicant has contemplated applying the principle, being set forth in detail in the following description and illustrated in the accompanying drawing, in which:

Figure 1 is a side elevation of the rear portion of a tractor, showing a plow connected thereto by means of the improved hookup;

Fig. 2 a detached, top plan view of the lift yoke, with parts broken away to show the manner in which the detachable portion is connected thereto, showing the spring loaded pin for attaching the two parts of the lift yoke together;

Fig. 3 a section through the lift yoke, on the line 3—3, Fig. 2;

Fig. 4 an exploded view showing the two parts of the lift yoke separated from each other; and Fig. 5 an enlarged, fragmentary, sectional elevation showing the connection of the forward end of the plow beam to the draw bar of the tractor.

Referring now to the construction illustrated in the accompanying drawing, in which similar numerals refer to similar parts throughout, the tractor is of conventional design and is shown generally in broken lines, the frame thereof being indicated by the numeral 10 and supported upon the tractor wheels 11.

A conventional draw bar 12 forms a part of the tractor, being supported at its rear end upon the anchor plates 13 on each side of the tractor, the forward ends of the draw bars being connected by clamps 14 to a transverse bar or rod 15 and being suspended at desired height by a control link 16.

This control link has a plurality of spaced apertures 17 therein, adapted to selectively receive a headed pin or bolt 18 for detachably connecting the control link in adjusted position to a bracket 19 upon the frame of the tractor.

The rear end of each draw bar is connected to the anchor plate 13 by a similar headed pin or bolt 20, located through suitable apertures in the anchor plate and draw bar. Ordinarily, for both of these connections, the headed pins or bolts 18 and 20 are provided at their inner ends with transverse openings through which cotter pins are located to retain them in place.

Whenever it is desired to remove the draw bar it is necessary to take pliers, or a similar tool, to straighten or align the outwardly bent ends of the cotter pins so that they may be removed from the apertures in the headed pins 18 and 20 in order to remove these headed pins.

Then, when it is desired to reattach the draw bars to the tractor, the cotter pins must again be placed through the openings in these headed pins 18 and 20, and frequently the cotter pins are damaged in removing them requiring that new cotter pins be obtained for this purpose.

One of the principal features of the improvement is the provision of the spring loaded pins 21 and 22, for engaging over the ends of the integral studs or removable headed pins 18 and 20, for retaining them in position without requiring the use of cotter pins or the like.

Each of these spring loaded pins is of the same construction as the spring loaded pin 23, which is used for attaching the plow beam to the draw bar and which is illustrated in detail and will be later described in detail.

The plow, indicated generally at 24, is of conventional design and has the beam 25, provided with the upwardly arched portion 26 to which is pivotally connected a lift link 27 of conventional design and a leveling bar sleeve 28, also of conventional design.

The lift yoke, indicated generally at 29, is attached in conventional manner to the rear portion of the frame 10 of the tractor and comprises the spaced parallel side members 30 and 31, the member 30 having the notch 32 at its forward end for engagement over the usual stud 33 upon the tractor, and having a depending arm 34, connected at its lower end to the tractor frame, while the side member 31 is bent downwardly, as at 35, and connected at its lower end to the tractor frame, all as in usual and well-known practice.

The two side members 30 and 31 are connected by a cross member 36, connected thereto at a point spaced from the rear ends thereof so that the protruding rear ends 37 may be normally received within the pockets 38, provided in the detachable portion of the yoke, indicated generally at 39.

The upper end of the lift link 27 is pivotally connected to a bracket 40, which is bolted to the detachable portion 39 of the lift yoke. Ordinarily, when it is desired to disconnect the plow, it is necessary to remove several bolts so that the bracket 40, connected to the lift link 27, may be removed from the yoke. With the present improvement it is not necessary to detach these bolts but the entire removable portion 39 of the yoke is removed as will be later described.

The diagonal brace rod 41 is pivotally connected at its upper end to the detachable portion 39 of the lift yoke and the lower end thereof is slidably mounted within the leveling sleeve 28. The detachable portion 39 of the lift yoke has the spaced transverse bars 42 and 43, connecting the pockets 38 which receive the end portions 37 of stationary part 29 of the yoke.

A central longitudinal bar 44 is connected to the lower edges of the transverse bars 42 and 43 and extends forwardly therefrom, the forward end of the bar 44 being tapered and downwardly curved, as at 45, and provided with an aperture 46 to receive the lower end of the spring loaded pin 47, which is slidably mounted through the ears 48 extending forwardly from the cross member 36 of the yoke.

A coil spring 49 is located around the pin 47, being interposed between the upper ear 48 and the collar 50 upon the pin, so as to normally urge the pin downward and into engagement with the aperture 46 in the bar 44 of the detachable portion of the yoke, as shown in Fig. 3.

The upper end of the spring loaded pin 47 is angularly bent, as at 51, to provide a handle for operating the same. A lug 52 extends upwardly from one side of the upper ear 48, forming a stop over which the angular handle 51 of the spring loaded pin may be located, as shown in Fig. 4, to hold the pin in retracted position.

The forward end of the plow beam 25 has a vertical opening 53 therein, to receive the headed pin or bolt 54 located through suitable apertures in the flanges 55, extending rearwardly from the draw bar clamp 14, so as to detachably connect the forward end of the plow beam to the draw bar.

In usual practice the connection between the draw bar and the forward end of the plow beam is made by a pin or bolt such as shown at 54, excepting that the lower end of this pin is ordinarily provided with a transverse opening through which a cotter pin is located to retain the pin or bolt in place.

The present invention contemplates the elimination of this cotter pin and the inconvenience and labor of removing and replacing the same, and for the purpose of normally holding the headed pin 54 in position, the spring loaded pin 23 is provided, being slidably located through ears 56 and 57, extending upward from the draw bar clamp, a coil spring 58 being located around this pin and interposed between the ear 57 and a shoulder 59 upon the pin, for normally urging the end of the pin into position over the head 60 of the headed pin or bolt 54, so as to retain said headed pin in position.

The forward end of the spring loaded pin 23 is angularly bent, as at 61, to provide a handle for manipulating the same, and a flange 62 is formed upon the clamp 14, and provided with an inclined edge as shown in Fig. 5, over which the handle 61 may be engaged to hold the pin 23 in retracted position so that the headed pin 54 may be removed.

The pin 23 is thus held in retracted position in the same manner that the pin 47, is held in retracted position by engagement of the angular handle 51 thereof over the lug 52, as shown in Fig. 4.

Since the details of the spring loaded pins 21 and 22 are identical with those of the spring loaded pin 23 it is not thought necessary to illustrate and describe each of them in detail.

When it is desired to remove the plow from the tractor, it is only necessary to withdraw the spring loaded pin 23 and remove the headed pin 54, disconnecting the forward end of the plow beam from the draw bar, and to withdraw the spring loaded pin 47 from engagement with the aperture 46 in the bar 44 of the detachable portion 39 of the yoke, permitting the same to be detached as shown in Fig. 4, so that the entire plow is thus quickly and easily removed from the tractor.

Whenever it may be desirable or necessary to remove the draw bar 12 and control link 16 from the tractor, it is only necessary to retract the spring loaded pins 21 and 22, when this entire assembly may be quickly and easily removed from the tractor.

From the above it will be seen that a simple and easily operated hookup is provided for detachably connecting a plow to a tractor and detaching it therefrom, without requiring the removal of any screws, bolts, nuts or cotter pins, the entire assembling and disassembling being quickly and easily accomplished merely by manipulating two spring loaded pins.

I claim:

1. In a hookup for a tractor and plow, a headed pin forming a detachable connection between two separable members, and a spring loaded pin located at substantially right angles to the headed pin, one end thereof normally engaging over the head of the headed pin to hold it in position, an angular handle portion at the other end of the spring loaded pin, and a stationary flange for engagement with said handle portion for holding the spring loaded pin in retracted position.

2. In a hookup for a tractor and plow, a headed pin forming a detachable connection between two separable members, and a spring loaded pin located at substantially right angles to the headed pin, one end thereof normally engaging over the head of the headed pin to hold it in position, an angular handle portion at the other end of the spring loaded pin, and a stationary flange having an inclined edge for engagement with said handle portion for holding the spring loaded pin in retracted position.

JOHN L. BEAMER.

REFERENCES CITED

The following references are of record in the file of this patent:

UNITED STATES PATENTS

| Number | Name | Date |
|---|---|---|
| 97,073 | Gates | Nov. 23, 1869 |
| 1,081,940 | Davis | Dec. 16, 1913 |
| 1,329,131 | Mepsted | Jan. 27, 1920 |
| 2,216,553 | Greene et al. | Oct. 1, 1940 |
| 2,342,306 | Silver | Feb. 22, 1944 |
| 2,430,696 | Acton | Nov. 11, 1947 |

FOREIGN PATENTS

| Number | Country | Date |
|---|---|---|
| 343,364 | Germany | Nov. 21, 1920 |